United States Patent
Davies et al.

(10) Patent No.: US 11,417,027 B2
(45) Date of Patent: Aug. 16, 2022

(54) IMAGE DATA PROCESSING METHOD AND APPARATUS

(71) Applicant: CANON MEDICAL SYSTEMS CORPORATION, Otawara (JP)

(72) Inventors: Ross Davies, Edinburgh (GB); Steven Reynolds, Edinburgh (GB)

(73) Assignee: CANON MEDICAL SYSTEMS CORPORATION, Otawara (JP)

(*) Notice: Subject to any disclaimer, the term of this patent is extended or adjusted under 35 U.S.C. 154(b) by 0 days.

(21) Appl. No.: 17/108,355

(22) Filed: Dec. 1, 2020

(65) Prior Publication Data

US 2022/0172402 A1 Jun. 2, 2022

(51) Int. Cl.
*G06T 9/00* (2006.01)
*G06T 15/08* (2011.01)
*G06T 15/06* (2011.01)

(52) U.S. Cl.
CPC ............... *G06T 9/00* (2013.01); *G06T 15/06* (2013.01); *G06T 15/08* (2013.01); *G06T 2210/41* (2013.01)

(58) Field of Classification Search
CPC .............................. G06T 15/08; G06T 17/005
See application file for complete search history.

(56) References Cited

U.S. PATENT DOCUMENTS

| | | | |
|---|---|---|---|
| 10,719,907 B2 | 7/2020 | Wahrenberg et al. | |
| 2007/0064002 A1* | 3/2007 | Xue | G06T 15/08 |
| | | | 345/426 |
| 2008/0260271 A1* | 10/2008 | Lundstrom | G06T 15/08 |
| | | | 382/239 |
| 2009/0096807 A1* | 4/2009 | Silverstein | G06T 11/001 |
| | | | 345/593 |
| 2013/0314417 A1 | 11/2013 | Buyanovskiy | |

FOREIGN PATENT DOCUMENTS

| | | |
|---|---|---|
| CN | 102096939 A | 6/2011 |
| CN | 104200511 A | 12/2014 |
| KR | 10-2004-0011921 A | 2/2004 |

OTHER PUBLICATIONS

Campoalegre, Lázaro, Isabel Navazo, and Pere Brunet Crosa. "Gradient octrees: A new scheme for remote interactive exploration of volume models." 2013 International Conference on Computer-Aided Design and Computer Graphics. IEEE, 2013. (Year: 2013).*
Park, Ji Hwan, Ievgeniia Gutenko, and Arie E. Kaufman. "Transfer function-guided saliency-aware compression for transmitting volumetric data." IEEE transactions on multimedia (2017). (Year: 2017).*
U.S. Appl. No. 16/884,588 filed May 27, 2020, Reynolds, S.
Balsa Rodriguez, M., et al., "A Survey of Compressed GPU-Based Direct Volume Rendering", Eurographics 2013 papers, pp. 117-136.

* cited by examiner

*Primary Examiner* — Ryan McCulley
(74) *Attorney, Agent, or Firm* — Oblon, McClelland, Maier & Neustadt, L.L.P.

(57) ABSTRACT

A medical image processing apparatus comprises processing circuitry configured to: acquire a data volume to be compressed; acquire a function relating color value to each data value of the data volume; and change a compression rate per region of the data volume based on color values in each region.

19 Claims, 4 Drawing Sheets

IMAGE DATA PROCESSING METHOD AND APPARATUS

FIELD

Embodiments described herein relate generally to an apparatus and method for image data processing, for example compressing an image data volume using multiple compression rates in dependence on gradient visibility.

BACKGROUND

Volumetric medical imaging techniques that can produce three-dimensional medical imaging data using any of a variety of imaging modalities, for example CT, PET, MRI, ultrasound, and X-ray, are widely used for imaging or diagnostic purposes.

Volumetric medical image data may comprise a three-dimensional array of voxels, each voxel representative of a particular position in three-dimensional space and each voxel having one or more data values. For example in the case of CT data, each voxel may have an associated intensity value that is representative of the attenuation of the applied X-ray radiation provided at the location represented by the voxel. The intensity value may be referred to as an image value, gray value, gray level, voxel value or CT value. The intensity value may be measured in Hounsfield units (HU).

In some data processing methods, a Graphics Processing Unit (GPU) is used to perform volume rendering of volumetric data, for example volumetric imaging data obtained from a medical imaging scanner.

A typical GPU has dedicated graphics memory, which may be located on a graphics card. For data to be operated on by a typical GPU, that data must be accessible in the dedicated graphics memory. Input data is uploaded to the graphics card for it to be operated on.

A typical GPU has a parallel architecture which allows the same computation to be run on different inputs many times, simultaneously. For example, the GPU may compute every pixel of an image at the same time, by applying the same algorithm at each pixel position.

GPU volume rendering may entail making use of a GPU to accelerate standard volume rendering techniques, for example Multi-Planar Reformatting (MPR), Shaded Volume Rendering (SVR), Intensity Projection (IP) or slab rendering.

Volume rendering (SVR) involves rendering a three-dimensional voxel dataset using a transfer function to specify color and opacity values for any given data value. The transfer function maps each of a series of possible voxel values to a respective opacity value and color value (usually represented by a combination of red, green and blue color values). Transfer functions are typically chosen to simulate specific materials or features. For example, muscle may be rendered in red and bone may be rendered in white.

Typically, much of the volume may be completely transparent. The volume may have large regions that are similar in color and/or transparency.

It is becoming increasingly common to use large imaging volumes. For example, in the case of medical imaging, increased medical scanner resolution may result in very large imaging volumes. Some volumes may be large enough that they cannot fit into the dedicated graphics memory of a GPU in their entirety.

Bigger image matrices are used in medical imaging. For example, a slice may comprise 512×512, 1024×1024 or 2048×2048 pixels. More slices may be obtained. As an example, a 2048×2048×6000 volume requires 47 GB of storage. Matrix sizes greater than 512×512 may be referred to as Large Scale.

It is desirable to render images from volumes quickly, and sometimes to render the images in real time.

The processing cost of moving around data may be high. Large data volumes may be larger than the data capacity of a typical graphical processing unit (GPU). Even high-end GPUs may struggle to accommodate the largest volumes. Mobile and virtual reality (VR) devices are typically limited in memory to the extent that even 512 matrix volumes may stretch their memory and capability.

Some existing compression schemes are unacceptably lossy. For example, the compression schemes may result in visible blocking artefacts. Some existing compression schemes are inapplicable to use in real time rendering. Some existing compression schemes are too costly to decode on-the-fly. Some existing compression schemes may be considered to be more focused on the data values themselves, than on the images obtained by rendering the data values.

Atlas-based methods, for example multi-map atlas-based methods, may be used to render large volumes. An example of an atlas-based method is described in U.S. Pat. No. 10,719,907, which is hereby incorporated by reference.

In an atlas-based method, sub-regions of volume data be sent to device memory as needed for rendering, instead of all volume data being uploaded at once. In atlas-based systems, current compression systems may not always be sufficient to get good performance. The process of uploading may be relatively slow, and may present a bottleneck in the rendering process. One criterion for a system having good performance may be that the system does not have to upload all of the volume data to a rendering device in order to render each frame.

Data transfer overhead may become dominant when memory capacity becomes heavily over-subscribed. The memory capacity may be said to be over-subscribed when too much data needs to be uploaded for each frame of rendering. The memory capacity may be considered to be heavily oversubscribed when the data to be rendered is twice as much as can be stored by the rendering device. If the data required to render an image is more than twice the rendering device's available memory, the entire volume may be uploaded for each frame.

It may be desirable to compress data such that data to be rendered is below twice a memory capacity. In the case of Large Scale data, a data volume size may be large enough that standard compression lossless techniques may not reduce the data volume size enough.

In some circumstances, current built-in compression schemes may not be able to compress a volume such that the data size is less than twice the memory capacity. The system may require transferring at least 50% of the total data volume for every frame that is rendered.

For example, if a data volume to be rendered is 12 GB in size, a standard lossless compression method may only reduce the size of the data volume to 10 GB. If a size of a memory of a rendering device that is to be used for rendering the compressed data is only 4 GB, then the rendering process may be highly inefficient due to the overhead of uploading data.

Best-case GPU transfer rates may be for example around 8 GB/s. Best-case GPU transfer rates may still result in delays of a second, or more than a second, in the case of Large Scale volumes.

SUMMARY

In a first aspect, there is provided a medical image processing apparatus comprising processing circuitry configured to: acquire a data volume to be compressed; acquire a function relating color value to each data value of the data volume; and change a compression rate per region of the data volume based on color values in each region.

The function may further relate opacity value to each data value of the data volume. The changing of the compression rate per region of the data volume may be based on color values and opacity values in each region.

The function may be a transfer function. The function may be a reflectance transfer function. The function may be a transmittance transfer function.

The processing circuitry may be further configured to render an image from the data volume using compression rates based on color values in each region, such that different regions are rendered using different compression rates. The processing circuitry may be further configured to render an image from the data volume using compression rates based on color values and opacity values in each region, such that different regions are rendered using different compression rates.

The processing circuitry may be further configured to divide the data volume into a plurality of blocks each comprising a plurality of pixels or voxels. The changing of the compression rate may be dependent on color values in each block. The changing of the compression rate may be dependent on color values and opacity values in each block.

The processing circuitry may be configured to determine an index value for each data value using the function. The index value may be dependent on color value. The index value may be dependent on color value and opacity value.

The apparatus may further comprise a memory configured to store the data values and index values. The changing of the compression rates may be in dependence on the index values corresponding to the data values within each region.

The determining of the index value for a given data value may comprise obtaining a difference between a combination of color and opacity for the given data value and a combination of color and opacity for an immediately preceding data value, and using the difference to determine an interval gradient visibility for the given data value. Using the difference to determine an interval gradient visibility may comprise comparing the difference to a threshold value.

The index value may comprise a summed gradient visibility value. The summed gradient visibility value for a given data value may be obtained by summing interval gradient visibility values from a minimum data value to the given data value.

The index values may be calculated in a CIELAB color space. Color values may comprise greyscale values.

The processing circuitry may be further configured to designate each block as containing a visible gradient, or as not containing a visible gradient. The designating of each block may be performed using the index values corresponding to the data values of pixels or voxels within the block.

The designating of each block as containing a visible gradient or as not containing a visible gradient may comprise: determining a range of data values that are obtainable by interpolation of the data values of pixels or voxels within the block; designating the block as not containing a visible gradient if there is no difference in index values within the range of data values; and designating the block as containing a visible gradient is there is a difference in index values within the range of data values.

The processing circuitry may be further configured to generate a plurality of downsized volumes from the data volume. Each of the downsized volumes may be generated using a different compression rate.

The processing circuitry may be further configured to divide each of the downsized volumes into a respective plurality of blocks, and to designate each block of each downsized volume as containing a visible gradient or as not containing a visible gradient.

The processing circuitry may be further configured to compute a sparse octree indicating, for each region of the data volume, the most-downsized block for that region that is designated as not containing a visible gradient.

The processing circuitry may be further configured to compute a mixed-resolution data volume using the sparse octree. The mixed-resolution data volume may comprise blocks from different ones of the downsized volumes.

The processing circuitry may be further configured to select a ray step size for a ray traversal based on the sparse octree.

The processing circuitry may be further configured to send the mixed-resolution data volume over a network connection to a further apparatus for rendering.

The processing circuitry may be further configured to re-compute the index values using a further, reduced threshold value.

The processing circuitry may be further configured to render a further image from the data volume in which compression rates are based on index values calculated using the further, reduced threshold value.

The processing circuitry may be configured to update the mixed-resolution data volume based on the further, reduced threshold value. The processing circuitry may be further configured to send the updated mixed-resolution data volume over the network connection to the further apparatus for rendering.

In a further aspect, there may be provided a medical mage processing method comprising: acquiring a data volume to be compressed; acquiring a function relating color value to each data value of the data volume; and changing a compression rate per region of the data volume based on color values in each region.

The function may further relate opacity value to each data value of the data volume.

The changing of the compression rate per region of the data volume may be based on color values and opacity values in each region.

In a further aspect, there may be provided a non-transitory computer-readable medium encoded with computer-readable instructions that, when executed by a computer, cause the computer to perform a method comprising: acquiring a data volume to be compressed; acquiring a function relating color value to each data value of the data volume; and changing a compression rate per region of the data volume based on color values in each region.

In a further aspect, which may be provided independently, there is provided a medical image processing apparatus comprising a processing circuitry configured to: acquire data to be compressed, change a compression rate based on assignment information of color value and opacity value corresponding to each data value of the data.

The processing circuitry may be further configured to: divide the data into blocks configured by a plurality of voxels, change the compression rate based on assignment information of color value and opacity value corresponding to each data value of the plurality of voxels included in the blocks.

The processing circuitry may be further configured to decide a necessity of compression of each block based on a difference of index values corresponding to the data values of voxels within the blocks.

The index values may be decided by sgv values which are decided based on difference of transfer function index values corresponding to the data values.

The index values may be decided by summing the sgv values proportional to the data values.

In a further aspect, which may be provided independently, there is provided a method for visualization of volume data using a compressed block-based data format where the needed level of downsizing for each block is computed through use of a summed gradient visibility table generated from the rendering transfer functions and in which the resulting mixed resolution volume is rendered to an image for display.

The summed gradient visibility table may be generated using color gradients computed in CIELAB's visually uniform color space.

The ray step-size may be modified to match the scaling of the resident downsampled block.

A sparse octree may be computed which describes the most-downsized block for a given region that passes the gradient threshold test, which is then used during ray traversal to dynamically alter the step size.

A rendering subsystem may resides on a second linked machine. The mixed-resolution data volume may be sent over a network connection for client-side rendering.

The threshold used to compute the summed gradient visibility table may be gradually reduced over time, such that the mixed-resolution volume slowly gains detail as additional high-resolution regions are streamed over the network.

In a further aspect, which may be provided independently, there is provided a method of rendering a view of a volumetric imaging data set representing a volume, in which a compressed block-based data format is used in which the volumetric imaging data set is downsized to blocks of lower resolution than the data set, and the method comprising: determining for blocks of different sizes whether a potentially visible image feature of interest, e.g. a gradient, would be present in an image resulting from the rendering being applied to the block; selecting block size in dependence on said determination of whether a potentially visible image feature of interest, e.g. a gradient would be present; and performing the rendering using the selected block size(s) to produce an image.

The rendering may comprise using a transfer function that determines color and/or opacity and/or other image parameters based on values of the data set. The method may comprise generating a gradient visibility table based on the transfer function, and performing the selecting of block size using the table.

The determining for blocks of different sizes whether a potentially visible image feature of interest, e.g. a gradient, would be present may comprise determining whether a gradient having a gradient value greater than a threshold would be present.

Different downsizing levels may be used for different regions in the volume dependent on the downsizing levels for different regions that would lead to gradients greater than a threshold being present in an image rendered from the downsized data.

The gradient visibility table may be generated using color gradients computed in a visually uniform color space.

The rendering may comprise using a ray casting process. Step-size of rays may be modified to match the scaling of the downsampled block(s).

A sparse octree may be computed which describes the most-downsized block for a given region that passes the gradient threshold test, which is then used during ray traversal to dynamically alter the step size.

The method may comprise performing the downsizing using a first processing resource, transmitting the downsized data over a network to a second processing resource, and performing the rendering to produce an image at the second processing resource.

The or a gradient threshold may be reduced over time, such that the rendered image gains detail over time as downsized data of higher-resolution is transmitted over the network and rendered.

Features in one aspect may be provided as features in any other aspect as appropriate. For example, features of a method may be provided as features of an apparatus and vice versa. Any feature or features in one aspect may be provided in combination with any suitable feature or features in any other aspect.

BRIEF DESCRIPTION OF DRAWINGS

Embodiments are now described, by way of non-limiting example, and are illustrated in the following figures, in which.

DETAILED DESCRIPTION

Figure 1:
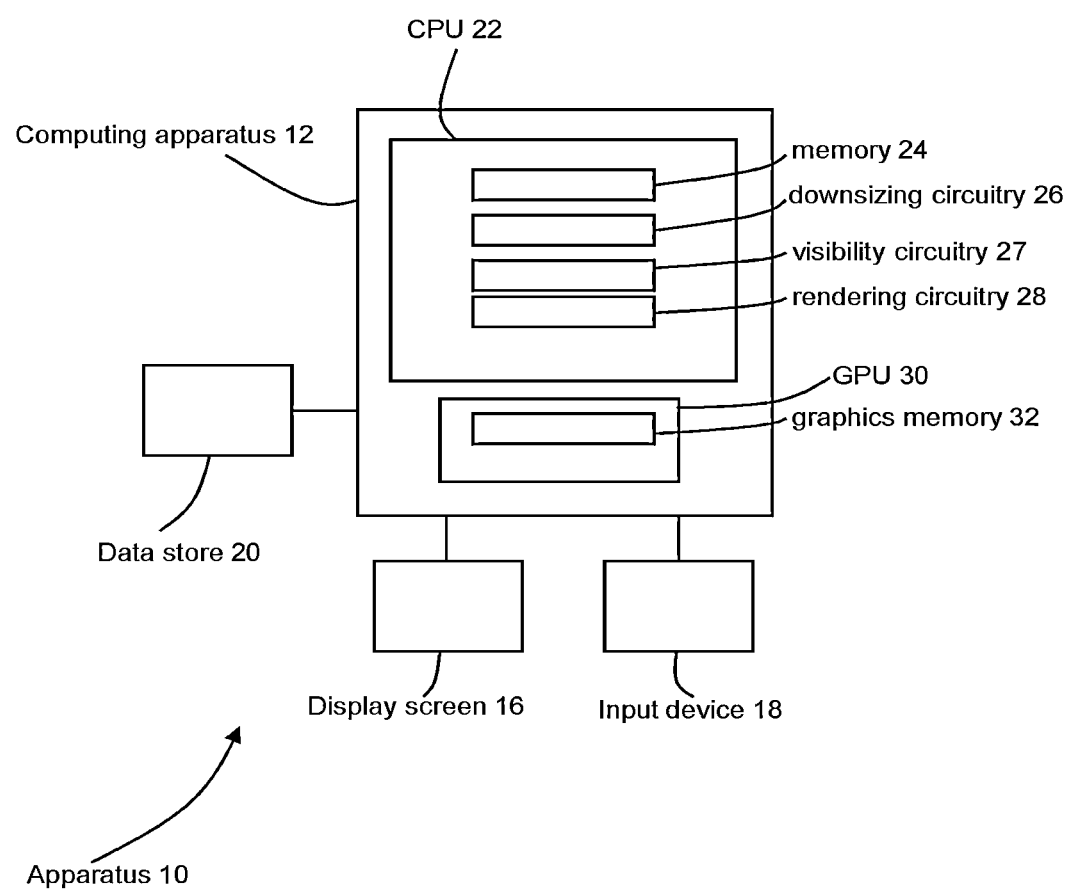
FIG. 1 is a schematic diagram of an apparatus in accordance with an embodiment.

A medical image processing apparatus 10 according to an embodiment is illustrated schematically in FIG. 1. The apparatus 10 is configured to perform volume rendering of image data acquired by any one or more of a plurality of medical imaging scanners (not shown). The medical imaging scanners may comprise at least one of a CT (computed tomography) scanner, an MRI (magnetic resonance imaging) scanner, an X-ray scanner, a PET (positron emission tomography) scanner, a SPECT (single photon emission computed tomography) scanner, or an ultrasound scanner, or any suitable scanner. In other embodiments, the apparatus 10 may be configured to process any suitable two-dimensional or three-dimensional image data.

The apparatus 10 comprises a computing apparatus 12, which in this case is a personal computer (PC) or workstation. In other embodiments, the computing apparatus 12 may be any suitable computing apparatus, for example a server, desktop computer, laptop computer, or mobile device. In further embodiments, functionality of the computing apparatus 12 may be provided by two or more computing apparatuses.

The computing apparatus 12 is connected to a display screen 16 or other display device, and an input device or devices 18, such as a computer keyboard and mouse. In alternative embodiments, the display screen 16 is a touch screen, which also acts as an input device 18.

In the present embodiment, the computing apparatus 12 is configured to receive the medical image data that is to be processed from a data store 20. The data store 20 stores data acquired by the plurality of medical imaging scanners.

In alternative embodiments, the computing apparatus 12 receives data from one or more further data stores (not shown) instead of or in addition to data store 20. For example, the computing apparatus 12 may receive data from one or more remote data stores (not shown) which may form part of a Picture Archiving and Communication System (PACS) or other information system, for example a laboratory data archive, an Electronic Medical Record (EMR) system, or an Admission Discharge and Transfer (ADT) system. In further embodiments, the computing apparatus 12 may receive data from one or more scanners directly.

Computing apparatus 12 comprises a central processing unit (CPU) 22 and a graphics processing unit (GPU) 30. The CPU 22 comprises a memory 24. The CPU 24 further comprises processing circuitry comprising downsizing circuitry 26 configured to generate downsized versions of an image data set, visibility circuitry 27 configured to determine a summed gradient visibility table from a transfer function and to use the summed gradient visibility table to determine per-block visibilities for downsized data sets, and rendering circuitry 28 configured to render an image from a mixed-resolution version of the downsized data set. The GPU 30 comprises a graphics memory 32. The GPU 30 is configured to perform rapid parallel processing of data stored in the graphics memory 32.

The CPU 22 and GPU 30 together provide a processing resource for automatically or semi-automatically processing medical imaging data.

In the present embodiment, the circuitries 26, 27, 28 are each implemented in computing apparatus 12 by means of a computer program having computer-readable instructions that are executable to perform the method of the embodiment. However, in other embodiments, the various circuitries may be implemented as one or more ASICs (application specific integrated circuits) or FPGAs (field programmable gate arrays).

The computing apparatus 12 also includes a hard drive and other components of a PC including RAM, ROM, a data bus, an operating system including various device drivers, and hardware devices including a graphics card. Such components are not shown in FIG. 1 for clarity.

Figure 2:
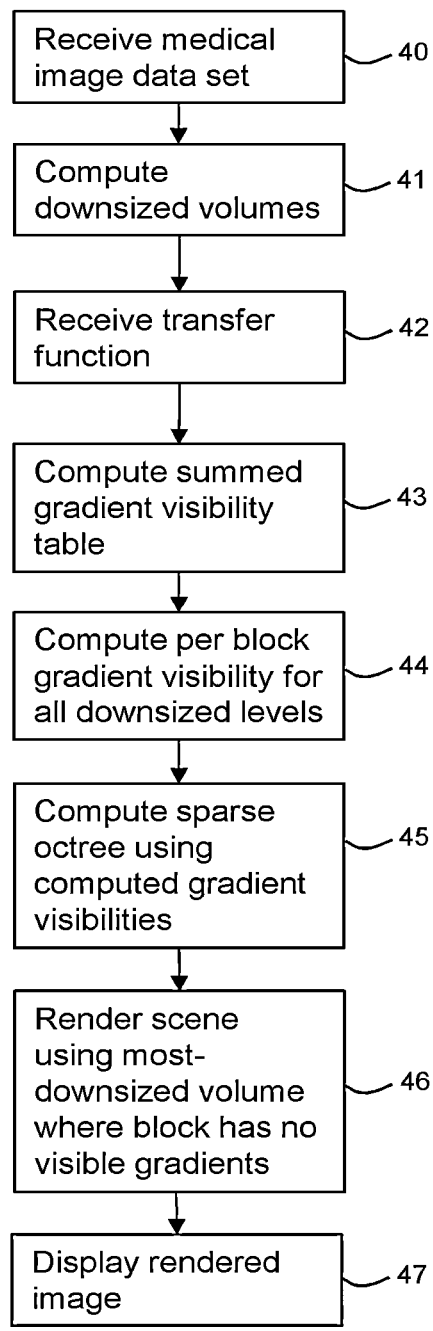
FIG. 2 is a flow chart illustrating in overview a method in accordance with an embodiment.

The apparatus of FIG. 1 is configured to perform a method of processing medical image data as illustrated in FIG. 2.

At stage 40, the downsizing circuitry 26 receives an image data set. In the present embodiment, the image data set comprises volumetric image data obtained from a CT scan. The volumetric image data set may also be referred to as a data volume or image data volume.

The image data set comprises respective intensity values for a plurality of voxels of the image data set. In further embodiments, the image data set may comprise any suitable medical image data or non-medical image data.

In some embodiments, the data set that is received at stage 40 may have undergone some pre-processing, for example some prefiltering to reduce speckle noise.

At stage 41, the downsizing circuitry 26 generates a set of downsized volumes. Each downsized volume is a downsized version of the image data set received at stage 40. The level of downsizing in each of the downsized volumes is half the resolution of the previous level. For example, if the original image data set has a size of 2048×2048×3000, then a first downsized volume has a size of 1024×1024×1500, a second downsized volume has a size of 512×512×750, and so on. In the present embodiment, 4 downsized volumes are generated, in additional to the original volume. In other embodiments, any suitable number of downsized volumes may be generated, for example 5, 6, 7, 8, 9 or 10 downsized volumes.

Any suitable method of downsizing may be used to generate the downsized volumes. For example, an averaging downsizing scheme may be used.

The downsizing circuitry 26 provides the image data set and downsized volumes to the visibility circuitry 27.

In some embodiments, downsized volumes have already been generated by other circuitry for use in interactive rendering modes. In such embodiments, the visibility circuitry 27 may receive the image data set and the downsized volumes at stage 40, and stage 41 may be omitted. The downsizing circuitry 26 may be omitted in some embodiments.

In other embodiments, the downsized volumes generated by the downsizing circuitry 26 are also provided to the rendering circuitry 28 for use in interactive rendering modes.

At stage 42, the visibility circuitry 27 receives a transfer function $tf$. The transfer function maps data values to corresponding opacity values and color values. In the present embodiment, the data values are CT values in Hounsfield units. The transfer function maps each integer CT value to a corresponding opacity value and color value. In other embodiments, any suitable type of data values may be used.

The transfer function $tf$ may be a predetermined transfer function that is stored, for example, in data store 20 or memory 24. In other embodiments, the transfer function $tf$ may be specified by a user and obtained via a user input.

Figure 3:
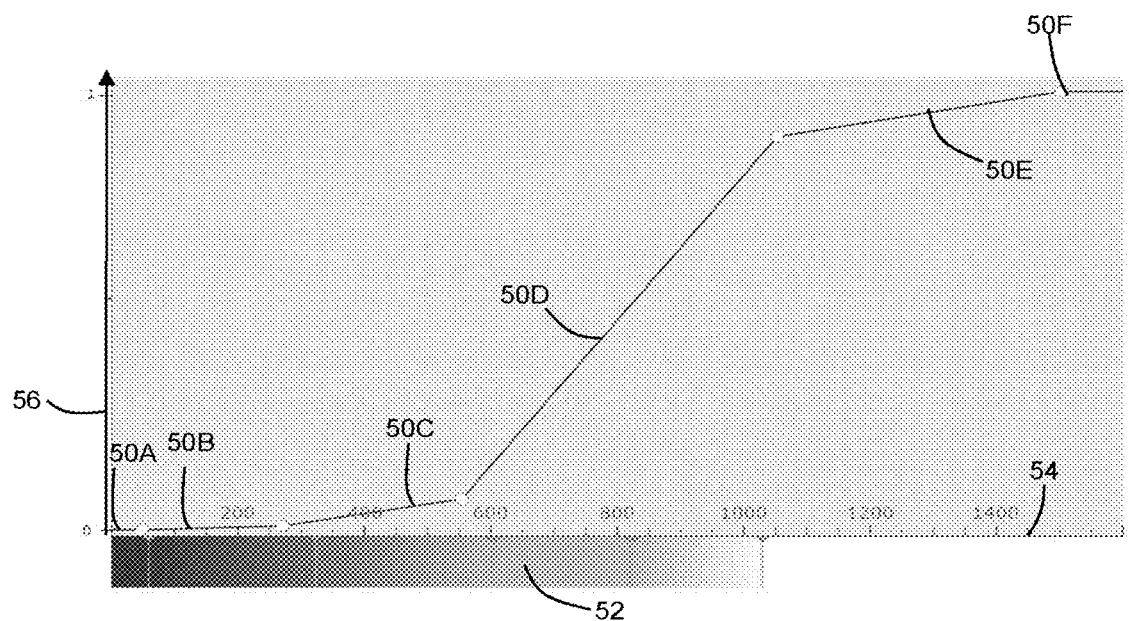
FIG. 3 is a plot of a transfer function in accordance with an embodiment.

FIG. 3 illustrates an example of a transfer function $tf$. The transfer function $tf$ comprises an opacity curve 50A to 50F and a color gradient 52, each plotted against the same horizontal axis 54 of data values, which in this embodiment are voxel CT values. In the example shown in FIG. 3, the scale of data values extends from 0 to 1600. The vertical axis 56 is material opacity. A scale of opacity values extends from 0 to 1.

The opacity curve comprises six sections 50A, 50B, 50C, 50D, 50E, 50F, each having a respective gradient in opacity value.

Section 50A is from data values from 0 to 40. In section 50A, values of opacity are low and almost constant. In section 50B, from data values from 40 to 260, opacity increases slowly. In section 50C, for data values from 260 to 550, opacity increases less slowly than in section 50B. In section 50D, for data values from 550 to 1020, opacity increases sharply. In section 50E, for data values from 1020 to 1470, the rate of increase of opacity is reduced. In section 50F, for data values from 1470 to 1600, opacity is almost constant.

In the example shown in FIG. 3, a common opacity value is used for all of red, green and blue, $tf_{opacity,r} = tf_{opacity,g} = tf_{opacity,b}$. In other embodiments, a colour-dependent opacity value may be used.

The color gradient 52 is the color mapping for each CT value. The color values of the color gradient 52 are represented in FIG. 3 as greyscale for ease of reproduction. In a full color version of the color gradient 52, it would be seen that data values below 500 are colored red, shading into orange. Data values around 600 are colored yellow. Above 750, the color values become grey then eventually white.

At stage 43, the visibility circuitry 27 uses the transfer function $tf$ to create a summed gradient visibility table. The summed gradient visibility table is designed for use in analyzing blocks of pixels or voxels to determine whether any visible color gradient is present in a given block of pixels or voxels.

To build the summed gradient visibility table, the visibility circuitry 27 first determines minimum data value DataMin and a maximum data value DataMax for the summed visibility table. In the present embodiment, the summed gradient visibility table has a length equal to the transfer function of interest tf. The minimum data value DataMin is the lowest data value in the transfer function, which in the transfer function of FIG. 3 zero. The maximum data value DataMax is the highest data value in the transfer function, which in the transfer function of FIG. 3 is 1600. The visibility circuitry 27 considers a set of integer data values i from DataMin to DataMax.

A summed gradient visibility value sgv(i) for each data value i in transfer function tf is calculated as follows, and is stored in the summed gradient visibility table. The summed gradient visibility value sgv(i) may also be described as an index value.

The visibility circuitry 27 uses transfer function tf to calculate a premultiplied color $tf_{premul}$ for each integer data value i by multiplying color values $tf_{color}(i)$ and opacity values $tf_{opacity}(i)$ for that data value. The premultiplied color is a combination of color values and opacity values for the given data value.

In the present embodiment, color is described using an RGB (red, green, blue) color space. $tf_{color}(i)$ has three color components $tf_{color}(i)_r$, $tf_{color}(i)_g$ and $tf_{color}(i)_b$ which may be together written as $tf_{color}(i)_{rgb}$. $tf_{opacity}(i)$ has three color components $tf_{opacity}(i)_r$, $tf_{opacity}(i)_g$ and $tf_{opacity}(i)_b$ which may be together written as $tf_{opacity}(i)_{rgb}$.

$$tf_{premul}(i) = tf_{color}(i)_{rgb} * tf_{opacity}(i)_{rgb} \quad \text{(Equation 1)}$$

Opacity is included in the premultiplied color because the effect of any color difference is dependent on opacity. A large color difference in a region that is highly transparent may still have little visual impact.

In other embodiments, any suitable color space may be used to represent color values. In some embodiments, the CIELAB color scale is used instead of RGB. The CIELAB color scale represents a color by three components, which in the CIELAB color scale are Lightness L* from black to white, a* from green to red, and b* from blue to yellow. CIELAB may be described as a visually uniform color space. The CIELAB color space is designed such that a given numerical change in values for L*, a* or b* causes a amount of color change that a viewer would perceive to be consistent, wherever that numerical change occurs within the color space.

Each entry in the summed gradient visibility table is then calculated using the following equation:

$$sgv(i) = \sum_{DataMin}^{i} \begin{cases} 0, & \|tf_{premul}(i) - tf_{premul}(i-1)\| < gt \\ 1, & \|tf_{premul}(i) - tf_{premul}(i-1)\| \geq gt \end{cases} \quad \text{(Equation 2)}$$

where gt is a threshold value for acceptable gradient. In the embodiment of FIG. 2, the threshold value gt=0.00031.

The threshold value gt is stored in the memory 24. In other embodiments, the threshold value gt may be stored in any suitable data store. In further embodiments, the threshold value gt may be input by a user.

In summary, Equation 2 compares premultiplied values in which color and opacity are multiplied together as shown in Equation 1. If the premultiplied color for a given data value differs from the premultiplied color from the immediately preceding data value is less than the threshold value gt, then an interval gradient visibility value for the given data value is set to 0. If a difference between the premultiplied value for the given data value and the immediately preceding data value is equal to or exceeds the threshold value gt, then the interval gradient visibility value is set to 1. The summed gradient visibility sgv(i) for data value i is a sum of all interval gradient visibility values corresponding to data values from DataMin to i.

The result is a function which is flat in all locations where there are no significant gradients in the pre-multiplied transfer function.

Figure 4:
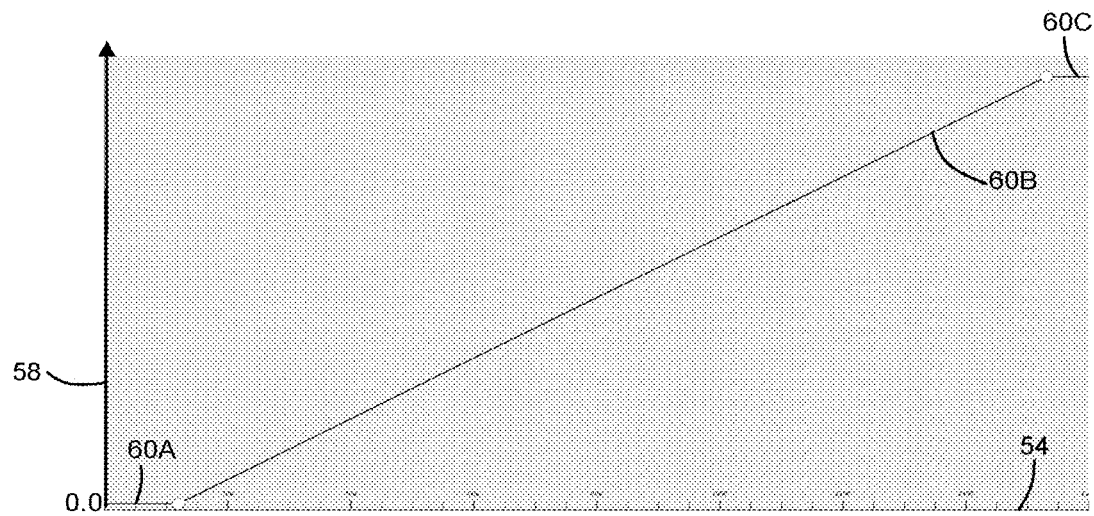
FIG. 4 is a plot of a gradient visibility curve in accordance with an embodiment.

FIG. 4 shows a curve of summed gradient visibility values obtained for the transfer function of FIG. 3. Horizontal axis 54 shows data value on the same scale as that of FIG. 3. Vertical axis 58 shows summed gradient visibility sgv(i). The vertical axis 58 of the summed gradient visibility function is a sum. It is a count of the number of visible colour transitions in the transfer function between the minimum CT value of the transfer function and the present CT value as shown on the x axis.

A summed gradient visibility curve 60A, 60B, 60C is shown for the transfer function tf of FIG. 3 and the threshold value gt=0.00031.

A first section 60A of the summed gradient visibility curve is for data values from 0 to 120. The summed gradient visibility curve is flat because there is no significant gradient in the pre-multiplied transfer function from 0 to 120.

A second section 60B of the summed gradient visibility curve is for data values from 120 to 1520. In this region, the summed gradient visibility increases due to gradients in the transfer function. In section 60B, there is an increase of 1 for each data value, since every color transition in this region is computed to be visible. The value of the sgv(x) function increases by 1 with each x-axis increment.

A third section 60C of the summed gradient visibility curve is for data values from 1520 to 1600. The summed gradient visibility curve is flat because there is no significant gradient in the pre-multiplied transfer function from 1520 to 1600.

The visibility circuitry 27 stores the summed gradient visibility table in memory 24. In other embodiments, the summed gradient visibility table may be stored in any suitable location. In further embodiments, any suitable method may be used to store summed gradient visibilities. For example, summed gradient visibilities may be stored in a list, in a look-up table, or as a function.

Figures 5, 6:
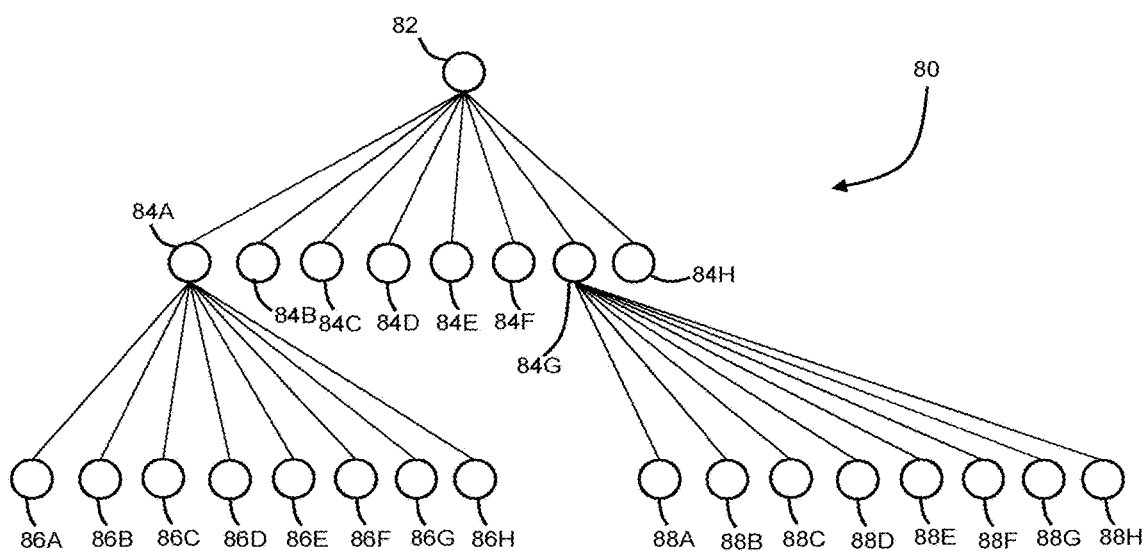
FIG. 5 is an example of a simplified summed gradient visibility table.
FIG. 6 is a representation of a simplified sparse octree structure.

FIG. 5 shows a simplified version of a summed gradient visibility table 70. The summed gradient visibility table of FIG. 5 has only 11 data values, from 0 to 10. The data values in FIG. 5 are unrelated to the transfer function shown in FIG. 3. The summed gradient visibility table of FIG. 5 is shown to provide a simple example of how values for summed gradient visibility are calculated.

A first line 71 of the summed gradient visibility table 70 comprises data values from DataMin, which in this example is 0, to DataMax, which in this example is 10. A second line 72 of the summed gradient visibility table 70 comprises color values for each of the data values of first line 70, as obtained from an appropriate transfer function (not shown). The color values comprise RGB values which are represented in FIG. 5 by letters, for example (x, x, x). The notation used in the exemplary summed visibility table 70 uses a prime symbol to denote very similar values, for example (x, x, x) and (x, x, x'). Different letters are used to denote more different colors, for example (x, x, x) and (x, x, y).

In practice, the second line stores sets of three numbers which are color values in red, green and blue.

A third line 73 of the summed gradient visibility table 70 comprises opacity values for each of the data values of first line 70, as obtained from an appropriate transfer function (not shown). In the example shown in FIG. 5, data values of 0, 1, 9 and 10 have an opacity value of zero. Opacity values for the other data values are 0.1.

A fourth line 74 of the summed gradient visibility table 70 comprises values of 0 or 1 for each data value. These are gradient visibility values before summation is performed. If the difference between $tf_{premul}(i)$ and $tf_{premul}(i-1)$ is less than the threshold value gt, then the corresponding interval gradient visibility value in the fourth line 74 is 0. If the difference between $tf_{premul}(i)$ and $tf_{premul}(i-1)$ is the same as greater than the threshold value gt, then the corresponding interval gradient visibility value in the fourth line 74 is 1.

A fifth line 75 of the summed gradient visibility table 70 comprises values for summed gradient visibility value. The values in the fifth line are obtained by summing interval gradient visibility values from DataMin to i.

Turning again to the flow chart of FIG. 2, at stage 44 the visibility circuitry 27 computes a per-block gradient visibility for each of the downsized volumes that was obtained at stage 41.

Consider an example of a downsized volume. The visibility circuitry 27 considers a plurality of blocks within the downsized volume. Each block has a block size of k×k×k pixels or voxels, which may also be written as $k^3$ voxels. In the present embodiment, a block size is 8×8×8 voxels. In other embodiments, any suitable block size may be used. A smaller block size may result in greater compression, but more overhead may be needed to calculate visibility for the blocks. In some embodiments, the block size may be as small as 1×1×1.

For each downsized volume level, the visibility circuitry 27 uses the summed gradient visibility table to find regions where the source data would display visible gradients. For each voxel in a block, the visibility circuitry 27 checks the minimum and maximum interpolated data values against the summed gradient visibility table.

Consider an individual voxel in the block. Each voxel has a respective set of coordinate values (x,y,z). The visibility circuitry 27 sets a region of interest around the voxel, which may also be referred to as a voxel neighbourhood. For example, the region of interest may comprise the voxel of interest and the nearest-neighbor voxels to the voxel of interest. The region of interest comprises voxels that may be potentially be combined with the selected voxel during interpolation. In the present embodiment, a size of the region of interest is the same as the block size. In other embodiments, any suitable region of interest may be used. For example, the region of interest may be larger than the block size.

The visibility circuitry 27 reads the data values for the voxels in the region of interest and determines a minimum data value for the data values for the voxels in the region of interest. The visibility circuitry 27 looks up the stored summed gradient visibility table to obtain a summed gradient visibility value $gv_{min}(x, y, z)$ for the minimum data value in the region of interest around the voxel at (x, y, z).

$$gv_{min}(x, y, z) = sgv \left( \min_{\substack{x \leq x_i \leq x+k+1 \\ y \leq y_i \leq y+k+1 \\ z \leq z_i \leq z+k+1}} (vol(x_i, y_i, z_i)) \right) \quad \text{(Equation 3)}$$

Equation 3 finds a minimum data value in a volume in a 3D range from x to x+k, y to y+k and z to z+k, where the block size is $k^3$, and then determines the summed gradient visibility for the minimum data value.

The visibility circuitry 27 reads the data values for the voxels in the region of interest and determines maximum data value for the data values for the voxels in the region of interest. The visibility circuitry 27 looks up the stored summed gradient visibility table to obtain a summed gradient visibility value $gv_{max}(x, y, z)$ for the maximum data value in the region of interest around the voxel at (x, y, z).

$$gv_{max}(x, y, z) = sgv \left( \min_{\substack{x \leq x_i \leq x+k+1 \\ y \leq y_i \leq y+k+1 \\ z \leq z_i \leq z+k+1}} (vol(x_i, y_i, z_i)) \right) \quad \text{(Equation 4)}$$

Equation 4 finds a maximum data value in a volume in a 3D range from x to x+k, y to y+k and z to z+k, where the block size is $k^3$, and then determines the summed gradient visibility for the maximum data value.

The minimum data value and maximum data value may be considered to define a range of possible interpolated data values. In other embodiments, any suitable method may be used to find the maximum and minimum values.

The visibility circuitry 27 designates the voxel as non-visible if the summed gradient visibility $gv_{min}(x,y,z)$ of the minimum data value is the same as the summed gradient visibility $gv_{max}(x,y,z)$ of the maximum data value.

The visibility circuitry 27 designates the voxel as visible if the summed gradient visibility $gv_{min}(x,y,z)$ of the minimum data value is not the same as the summed gradient visibility $gv_{max}(x,y,z)$ of the maximum data value.

$$\text{VoxelVisible}(x, y, z) = \begin{cases} \text{true,} & gv_{min}(x, y, z) \neq gv_{max}(x, y, z) \\ \text{false,} & gv_{min}(x, y, z) = gv_{max}(x, y, z) \end{cases} \quad \text{(Equation 5)}$$

If the values produced differ, it is determined that the voxel contains a potentially visible gradient and VoxelVisible(x, y, z) is set to true. If the values produced differ, it is determined that the voxel does not contain a potentially visible gradient and VoxelVisible(x, y, z) is set to false.

If the summed gradient visibility of the minimum data value is the same as the summed gradient visibility of the maximum data value, it may be considered that there is no color gradient above the threshold in the neighborhood of the voxel. The combination of color values and opacity values may be similar for all of the possible interpolated data values in the neighborhood of the voxel. The neighborhood of the voxel may be considered to be homogeneous.

It is intended to retain blocks having potentially visible gradients in the final rendering. The visibility circuitry 27 designates a block as visible if any of the voxels in the block are designated as visible.

$$BlockVisible(k, x, y, z) = \mathop{\text{or}}_{\substack{kx \leq x_i \leq k(x+1) \\ ky \leq y_i \leq k(y+1) \\ kz \leq z_i \leq k(z+1)}} VoxelVisible(x_i, y_i, z_i) \quad \text{(Equation 6)}$$

The visibility circuitry 27 determines per-block gradient visibility for the blocks of each of the downsized volumes. Volumes with a higher level of downsizing are formed of fewer blocks than volumes with less downsizing.

In the embodiment of FIG. 2, summed gradient visibility values are used as index values in the determining of per-block visibility. In other embodiments, any suitable index values may be used. Visibility may be determined based on interval gradient visibility values for each data value. Visibility may be determined from any suitable combination of opacity and color values, or parameters or functions based on opacity and color values. Index values may be stored in any suitable format, for example any suitable table, list or function.

At stage 45, the visibility circuitry 27 computes a sparse octree structure. The sparse octree structure has as many levels as there are downsized volumes. In the present embodiment the sparse octree structure has four downsized levels, plus a level that is representative of the original non-downsized volume. The sparse octree structure is computed using the per-block visibility values calculated at stage 44.

An octree structure is a node structure in which each node branches into eight child nodes. Octree structures are often used in three-dimensional rendering.

In the present embodiment, a node in the first level of the octree structure is representative of a block in the most-downsized volume.

If the block in the most-downsized volume does not have any gradients greater than the threshold value, and so has been designated as non-visible at stage 44, no child nodes are created from the node representing the block in the first level.

If the block in the most-downsized volume does contain gradients greater than the threshold value, and so has been designated as visible at stage 44, eight child nodes in a second level are created from node representing the block in the first level. Each of the eight child nodes is representative of a block in the second-most-downsized level that is an eighth of the size of the block in the most-downsized level.

If a child node does not have any gradients greater than the threshold value, no further child nodes are created from that child node. If the child node does have gradients greater than the threshold value, eight further child nodes in a third level are created from that child node.

The tree depth of the octree at each point is equal to the most-downsized block in a region which does not display gradients greater than the threshold. Wherever gradients greater than the threshold are present, the octree proceeds downwards and creates further nodes until no gradients greater than the threshold are present, or until the original non-downsized volume is reached.

FIG. 6 shows a simplified example of part of a sparse octree structure 80. A node 82 in a first level of the sparse octree structure 80 corresponds to a block in the most-downsized volume. The first level of the sparse octree structure also comprises other nodes corresponding to the other blocks of the most-downsized volume, which are not illustrated in FIG. 5.

In the example of FIG. 5, the block represented by node 82 is determined at stage 44 to contain at least one visible gradient. Therefore, eight child nodes 84A to 84H are generated from node 80. The eight child nodes represent blocks that together occupy the same volume as the block represented by node 80. The eight child blocks are in a second level of the sparse octree structure 80. Each block at the second level is an eighth of a size of a block in the first level.

The visibility circuitry 27 has determined visibility of each of the eight child blocks 82A to 82H at stage 44. In the example of FIG. 5, the blocks for child nodes 84A and 84G are each determined to contain visible gradients. The blocks for child nodes 84B, 84C, 84D, 84E, 84F, 84H are determined not to contain visible gradients. Therefore, further child nodes are generated from child nodes 84A and 84G, but no further child nodes are generated from child nodes 84B, 84C, 84D, 84E, 84F, 84H. The octree structure 68 is sparse because only some of the nodes at a given level of the octree have child nodes.

Eight further child nodes 86A to 86H are generated from child node 84A. Eight further child nodes 88A to 88H are generated from child node 84G.

In practice, the sparse octree structure 80 is likely to have more than three levels. The visibility determination of stage 44 is used to determine which nodes of the sparse octree structure 80 have child nodes.

The sparse octree structure 80 has a greater depth in regions of the image volume where there is greater color variation, which may suggest that there is greater anatomical detail in these regions. The sparse octree structure 80 has less depth in regions of the image volumes that are substantially homogeneous in color.

The sparse octree structure 80 may provide a quick method of performing a sparse spatial look-up of the image volume. There may be no need to index all data to perform the spatial look-up.

At stage 46, the rendering circuitry 28 renders an image from the volumetric image data set using the sparse octree structure 80 determined at stage 45.

The rendering circuitry 28 determines a mixed-resolution data set using the sparse octree structure 80. The mixed-resolution data set may also be referred to as a mixed-resolution data volume. The mixed-resolution data set comprises, for each region of the image volume, the most-downsized block for that region that does not contain any visible gradients. Therefore, different parts of the mixed-resolution data set come from different downsized volumes. Some regions of the mixed-resolution data set are more compressed than others.

The sparse octree structure 80 is used to ascertain a best downsizing level to use for each occupied block of the volumetric imaging data set. The rendering circuitry 28 interrogates the sparse octree structure 80 to find the most-downsized blocks that were designated as non-visible at stage 44.

By referencing downsizing level when sampling, rendering may be performed using the most downsized level that does not contain visible gradients. A more downsized version of the volumetric imaging data set may be used to render regions that contain little color variation, while a less downsized version or non-downsized version is used to render regions that contain more color variation.

The rendering circuitry 28 passes the mixed-resolution data set to the GPU memory 32. The GPU 30 samples the mixed-resolution data set using a conventional sampling method. In the present embodiment, an atlas-based system is used to handle management and upload of various volume data blocks. One example of an atlas-based system is described in U.S. Pat. No. 10,719,907, which is hereby incorporated by reference. A region of memory on the GPU 30 is pre-allocated for storage of volume data, plus an index which provides a memory location for any specified location. Based on an allowable compression calculated as described above, downsized regions of the data are sent to the GPU, with the index being updated to point to the downsized data.

In the present embodiment, a rendering method used is Shaded Volume Rendering (SVR), which comprises ray-tracing. When rendering a block, the rendering circuitry 28 looks up the sparse octree structure 80 to find a downsizing level to be used for that block. A ray step size used in the ray tracing is modified based on the downsizing level of a currently occupied block. If a block through which the ray is passing is not downsized, a first ray step size between ray sampling points is used. If the block through which the ray is passing is downsized, the ray step size between ray sampling points may be reduced. For example, when sampling from a 2× downsized volume, the ray step size used may be double the first ray step size. Using an increased ray step size may accelerate rendering.

In some circumstances, looking up the sparse octree structure 68 may cause some slowing of rendering. Reducing the ray step size in downsized blocks may compensate for such slowing.

At stage 47, rendering circuitry 28 displays a rendered image on the display screen 16.

The method of FIG. 2 may enable rendering of volumes that would be much larger than the available device memory. Memory requirements of Large Scale may be greatly reduced. The amount of data uploaded to a GPU may be significantly reduced.

The method of FIG. 2 may provide a transfer function aware block-based compression scheme for volume rendering which may achieve of the order of 10:1 compression in realistic cases. For example, compression may range from 3:1 to 30:1 depending on the data used and on the transfer function applied. A calibration value (threshold value gt) may be used to change a degree of compression.

It has been found that the method of FIG. 2 scales well as volumes become larger.

The sparse octree structure 80 may provide a quick method of performing a sparse spatial lookup, without all data being indexed. Identical areas of the data set may use a higher level nodes of the sparse octree structure 80, and so a higher level of compression, without being subdivided.

An example large-matrix volume was compressed using the method described above with reference to FIG. 2. At full resolution of 1024×1024×221, a size of the volumetric image data set was 442 MB. At mixed resolution, with resolution of each region of the image volume determined using the method of FIG. 2, a size of the volumetric image data set was 45 MB. Images rendered using the full resolution and rendered using the mixed resolution were extremely similar. A significant level of compression was therefore achieved using the method of FIG. 2.

In experiments testing the method of FIG. 2, it was found that a compression rate of 9.8:1 was achieved using the transfer function of FIG. 3. A compression rate of 30:1 was achieved when using a box bone transfer function in which only bone is visualized without flash. A compression rate of 3:1 was achieved using a foggy transfer function, in which the entire volume is visible, but some is only slightly visible.

By modifying the gradient visibility threshold value gt, a compression rate may be traded off against visual fidelity. A higher value for the threshold value gt results in higher compression, but the image may differ somewhat from an image that is produced at full resolution. In some circumstances, such changes in the image may be acceptable to the user. In some embodiments, the user can choose a gradient visibility threshold value gt directly, or choose an acceptable level of image degradation.

In one example, a plurality of images are rendered from the same volumetric image data set using different values of threshold value gt. A size of the full-size volume is 442 MB.

A first image is rendered using gt=0.001. A size of the resulting compressed data set is 14.3 MB, which is a compression rate of 30.8:1.

A second image is rendered using gt=0.0003. A size of the resulting compressed data set is 20.2 MB, which is a compression rate of 21.9:1.

A third image is rendered using gt=0.00005. A size of the resulting compressed data set is 33.4 MB, which is a compression rate of 13.2:1.

A fourth image is rendered using gt=0.000025. A size of the resulting compressed data set is 82.2 MB, which is a compression rate of 5.4:1.

For each of the first to fourth images, a respective difference image is obtained which is representative of a difference between the image and an image rendered using the full uncompressed data set. The differences shown in the respective difference images reduce as the threshold value gt is decreased. At the lowest threshold value, it may be extremely difficult for a user to perceive any differences in the image.

A fifth image is rendered using a downsized volume that is downsized using 2× downsizing. The downsized volume has a fixed resolution rather than a mixed resolution. The downsized volume was not obtained using the method of FIG. 2. The downsized volume size is 55 MB. The compression rate is 8:1.

A difference is obtained between an image rendered using the full-size volume, and the fifth image, which is rendered using the 2× downsized volume.

A sixth image is rendered using the method of FIG. 2 and a threshold value gt=0.0000275. The threshold value is chosen to result in a similar size of data set to that of the 2× downsized data set used to render the fifth image. The data size of the mixed resolution data set used in rendering the sixth image is 54 MB. The compression rate is 8.2:1.

A difference is obtained between an image rendered using the full-size volume, and the sixth image, which is rendered from a mixed-resolution data set obtained using the method of FIG. 2.

A difference between the sixth image (rendered using the method of FIG. 2) and the image rendered from the full-size volume is a lot smaller than the difference between the fifth image (rendered using fixed-resolution 2× downsizing) and the image rendered from the full-size volume. The sixth image, which is rendered using the method of FIG. 2, retains much more detail than the fifth image obtained using pure downsizing.

By using the method of FIG. 2, improved image quality may be obtained from a similar data size by using a compression rate that varies per region of the data set, rather than a fixed compression rate.

Application of the method of FIG. 2 may not be limited solely to large-scale volume data. A degree of compression for smaller-matrix volumes may be reduced because a smaller-matrix volumes typically contains larger gradients.

However, compression for smaller-matrix volumes may still be achieved in a similar fashion to compression for larger-matrix volumes.

The method of FIG. 2 may also be used for applications on hardware with more limited available memory. Mobile devices or augmented reality (AR) or virtual reality (VR) may benefit from compression of rendered data, even for conventional data resolutions. For example, a realistic 6:1 compression of the rendered data may be very useful in allowing mobile devices to render larger conventional volumes.

In some embodiments, the method of FIG. 2 is used to facilitate data transfer between devices. For example, a mixed-resolution data set may be obtained by a first apparatus using the method of FIG. 2. The mixed-resolution data set may be transferred to a second apparatus for rendering.

Transmitting a compressed data set rather than the full data volume may, for example, enable much accelerated in-browser rendering of conventional data volumes. For example, transferring a 400 MB conventional volume (512× 512×800) over a network may be very costly. Transferring a 40 MB compressed volume over a network may be much faster.

In some embodiments, volume quality is gradually refined by altering the threshold value gt. For example, in one embodiment a first apparatus generates a first data set by compressing an original data volume using a first threshold value gt. For example, the first data set may have 30:1 compression. The first apparatus transfers the first data set to a second apparatus. The second apparatus renders an image from the first data set, and displays the rendered image.

While the second apparatus is rendering the image from the first data set, the first apparatus generates and transfers a second data set which is a less compressed representation of the original data volume. The second data set is compressed using a second, lower threshold value gt. The second data set is larger than the first data set. The second apparatus refines the displayed image by rendering the second data set.

Any number of data sets may be transmitted, with different degrees of compression. Decreasing the threshold value gt improves a level of detail in the rendered image.

In some embodiments, decreasing threshold values may be used in rendering even when all of the rendering is performed on one apparatus. By using a higher degree of compression first, an image may be displayed to a user in a time that the user considers to be acceptable. The image may then be refined over time.

In the method of FIG. 2, rendering is performed using SVR. In other embodiments, Global Illumination rendering is performed. In systems that use Global Illumination, memory is shared between volumetric image data and a photon map. In many cases, 50% of the memory is allocated to the volumetric image data and 50% of the memory is allocated to the photon map. By significantly compressing the volumetric image data, the memory requirements of the overall system may be significantly relaxed.

In some embodiments, summed gradient visibility logic is applied to the transmittance transfer function used in photon mapping. A transmittance transfer function describes colors of light that are permitted to pass through a material. The transmittance transfer function is used to perform a method of photon rendering, which aims for greater realism by modelling that transmittance to achieve realistic shadows. The photon rendering involves a photon mapping stage before the primary render. In the photon mapping stage, the paths of individual photons are traced in the scene. An energy loss of the photons as they pass through materials is modelled. In order to compress a photon volume using summed gradient visibility methods, the transmittance transfer function is used.

In some embodiments, an intensity projection (IP) view is rendered. Rendering may comprise multi-planar reconstruction. A summed gradient visibility table is constructed using a window width and window level. In some embodiments, an IP view is rendered using a mapping from data value to greyscale shade. In other embodiments, a full color transfer function is applied to the data values. Interval visibility values are determined by obtaining a difference between color values for each interval (where color may include greyscale), and comparing the difference in color values to a threshold value. Interval visibility values are then summed from a minimum value to a given data value to obtain a summed gradient visibility value for the data value. Compression is performed using summed gradient visibility values as described above.

In some embodiments, a computation of the downsampling needed for each block may be accelerated by using a min-max tree. The min-max tree contains a minimum and maximum data value for each block.

In some embodiments, the use of summed gradient visibility is combined with use of an atlas-based system. One atlas-based system is described in U.S. Pat. No. 10,719,907, which is hereby incorporated by reference. The atlas-based system uses a bricked structure, which may also be described as a structure blocks. An offset compression system used by the atlas-based system may be used in conjunction with summed gradient visibility compression using the method of FIG. 2. Regions of a data set may be stored in regions of a multi-channel atlas texture by using a transformation vector to alter data values by weighting or offsetting. Data values may then be recovered using the transformation vector.

Using an atlas-based method in combination with a mixed-resolution data set may further improve performance. An upload burden may be reduced.

Although the embodiments above are described with regard to medical imaging data, in other embodiments any data may be compressed and/or rendered using methods described above. For example, the data may comprise oil and gas data. The data may comprise three-dimensional microscopy data. The data may comprise, for example, climate data, geological surveys, demographics or games data. The methods may be used in any application for which fast parallel sampling is used, for example fast parallel sampling of different data types. The methods may be used in any voxelized transfer-function based system.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments have been described, these embodiments have been presented by way of example only, and are not intended to limit the scope of the invention. Indeed the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. A medical image processing apparatus comprising:
a memory; and
processing circuitry configured to:
acquire a data volume to be compressed;
acquire a function relating color value to each data value of the data volume;
determine an index value for each data value using the function, wherein the index value is dependent on color value and the index value is determined by obtaining a difference between a combination of the color value and opacity for the data value and a combination of the color value and opacity for an immediately preceding data value, and using the difference to determine an interval gradient visibility for the data value;
store the data values and index values in the memory; and
change a compression rate per region of the data volume based on color values in each region and in dependence on the index values corresponding to the data values within each region.

2. The apparatus according to claim 1, wherein different regions are rendered using different compression rates.

3. The apparatus according to claim 1, wherein the processing circuitry is further configured to divide the data volume into a plurality of blocks each comprising a plurality of pixels or voxels; and
wherein the changing of the compression rate is dependent on color values in each of the plurality of blocks.

4. The apparatus according to claim 3, wherein the index values are calculated in a CIELAB color space.

5. The apparatus according to claim 3, wherein the processing circuitry is further configured to designate the each of the plurality of blocks as containing a visible gradient, or as not containing a visible gradient, wherein the designating of each block is performed using the index values corresponding to the data values of pixels or voxels within the block.

6. The apparatus according to claim 5,
wherein the designating of the each of the plurality of blocks as containing the visible gradient or as not containing the visible gradient comprises:
determining a range of data values that are obtainable by interpolation of the data values of pixels or voxels within the block;
designating the block as not containing the visible gradient if there is no difference in index values within the range of data values; and
designating the block as containing the visible gradient if there is a difference in index values within the range of data values.

7. The apparatus according to claim 1, wherein using the difference to determine an interval gradient visibility comprises comparing the difference to a first threshold value.

8. The apparatus according to claim 7, wherein the index value comprises a summed gradient visibility value, wherein the summed gradient visibility value for the data value is obtained by summing interval gradient visibility values from a minimum data value to the data value.

9. The apparatus according to claim 7, wherein the processing circuitry is further configured to re-compute the index values using a second threshold value that is less than the first threshold value.

10. The apparatus according to claim 9, wherein the processing circuitry is further configured to render a further image from the data volume in which compression rates are based on index values calculated using the second threshold value.

11. The apparatus according to claim 1, wherein the processing circuitry is configured to generate a plurality of downsized volumes from the data volume, wherein each of the downsized volumes is generated using a different compression rate.

12. The apparatus according to claim 11, wherein the processing circuitry is configured to divide each of the downsized volumes into a respective plurality of blocks, and to designate each block of each downsized volume as containing a visible gradient or as not containing a visible gradient.

13. The apparatus according to claim 12, wherein the processing circuitry is configured to compute a sparse octree indicating, for each region of the data volume, a most-downsized block for that region that is designated as not containing a visible gradient.

14. The apparatus according to claim 13, wherein the processing circuitry is configured to compute a mixed-resolution data volume using the sparse octree, such that the mixed-resolution data volume comprises blocks from different ones of the downsized volumes.

15. The apparatus according to claim 14, wherein the processing circuitry is configured to send the mixed-resolution data volume over a network connection to a further apparatus for rendering.

16. The apparatus according to claim 15, wherein the processing circuitry is configured to update the mixed-resolution data volume based on a threshold value and to send the updated mixed-resolution data volume over the network connection to the further apparatus for rendering.

17. The apparatus according to claim 13, wherein the processing circuitry is further configured to select a ray step size for a ray traversal based on the sparse octree.

18. A medical image processing method comprising:
acquiring a data volume to be compressed;
acquiring a function relating color value to each data value of the data volume;
determining an index value for each data value using the function, wherein the index value is dependent on color value and the index value is determined by obtaining a difference between a combination of color and opacity for the data value and a combination of color and opacity for an immediately preceding data value, and using the difference to determine an interval gradient visibility for the data value;
storing the data values and index values in a memory; and
changing a compression rate per region of the data volume based on color values in each region and in dependence on the index values corresponding to the data values within each region.

19. A medical image processing apparatus comprising:
processing circuitry configured to:
acquire a data volume to be compressed;
acquire a function relating color value to each data value of the data volume;
divide the data volume into a plurality of blocks each comprising a plurality of pixels or voxels;

change a compression rate per region of the data volume based on color values in each region and in dependence on color values in each of the plurality of blocks; and designate the each of the plurality of blocks as containing a visible gradient, or as not containing a visible gradient, wherein the designating of the each of the plurality of blocks as containing the visible gradient or as not containing the visible gradient comprises:

determining a range of data values that are obtainable by interpolation of the data values of pixels or voxels within the block;

designating the block as not containing the visible gradient if there is no difference in index values within the range of data values; and designating the block as containing the visible gradient if there is a difference in index values within the range of data values.

\* \* \* \* \*